United States Patent [19]

Etchison, Jr. et al.

[11] 4,353,614

[45] Oct. 12, 1982

[54] UNITARY MOLDED PLASTIC CONNECTOR PLUG SUPPORT MEMBER

[75] Inventors: John O. Etchison, Jr., Clemmons; Robert H. W. Jones, Jr., Greensboro, both of N.C.

[73] Assignee: Western Electric Company, Inc., New York, N.Y.

[21] Appl. No.: 130,497

[22] Filed: Mar. 14, 1980

[51] Int. Cl.$^{3}$ .................................... H02B 1/02

[52] U.S. Cl. .................................... 339/125 R; 361/415

[58] Field of Search .............. 339/119, 125; 179/1 PC, 179/98; 361/412, 415, 427

[56] References Cited

U.S. PATENT DOCUMENTS

| | | | |
|---|---|---|---|
| 3,222,442 | 12/1966 | Parker et al. | 264/277 |
| 3,458,767 | 7/1969 | Hedger et al. | 317/101 |
| 3,467,944 | 9/1969 | Hammell et al. | 339/125 R |
| 3,518,611 | 6/1970 | Shores, Jr. | 179/98 X |
| 3,564,479 | 2/1971 | Gluntz | 339/14 |
| 3,848,952 | 11/1974 | Tighe, Jr. | 339/125 R X |
| 4,038,696 | 7/1977 | Etchison et al. | 361/415 |
| 4,131,330 | 12/1978 | Stupay | 339/125 R |
| 4,131,933 | 12/1978 | Agard et al. | 361/415 |
| 4,179,172 | 12/1979 | Godsey et al. | 339/17 LM |
| 4,242,721 | 12/1980 | Krolak et al. | 361/415 |

*Primary Examiner*—John McQuade
*Assistant Examiner*—Frank H. McKenzie, Jr.
*Attorney, Agent, or Firm*—D. D. Bosben

[57] ABSTRACT

A unitary molded plastic backplane (12) having high strength and resistance to flexing, includes spaced pedestals which project from one side of a main body (34) and which support connector plugs (14) on the backplane (12). Stepped edge and center portions (56, 57 and 60) of the backplane (12) define elongated recesses (58, 59 and 61) for receiving other associated support members (22, 24 and 26). The pedestals (36) and stepped edge portions (56 and 57) define channels (40, 41 and 42) for receiving wires (18) interconnecting the connector plugs (14) and input/output connectors (16) on the backplane (12). Integral support legs (44) project from the one side of the main body (34) beyond the connector plugs (14). Projecting cylindrical housings (68) receive mounting screws (66) to preclude tightening of the screws down onto adjacent wires 18. Alignment of the backplane (12) in associated equipment is facilitated by alignment tabs (48), tab-receiving recesses (50) and projecting lugs (62 and 64).

16 Claims, 6 Drawing Figures

UNITARY MOLDED PLASTIC CONNECTOR PLUG SUPPORT MEMBER

TECHNICAL FIELD

This invention relates to a connector plug support member, and more specifically to a backplane of unitary molded plastic construction having high strength and resistance to flexing, for use in a communications bay module.

BACKGROUND OF THE INVENTION

The J. O. Etchison, Jr. et al. U.S. Pat. No. 4,038,696 discloses a system for assembling and wiring connector plugs for use in a communications bay, in which a row of the connector plugs is mounted in a respective backplane which has been fabricated from sheet metal. The connector plugs in respective pairs of the backplanes then are interwired in a fabricating station to form prewired assemblies each including two of the backplanes and their associated connector plugs, interconnected by wiring therebetween. Generally, these wired connector plug-backplane assemblies then are mounted in a communications bay frame, and further wired to one another in the frame, at another fabricating station. In addition, where it is desired to expand the capacity of existing bay frames in a central office, wired connector plug-backplane assemblies can be shipped to the field for installation in the existing bay frames.

In communications equipment of the type disclosed in the Etchison et al. patent, the electrical design of the equipment is such that the wired connector plug-backplane assemblies for each bay frame had to be mounted in the bay frame and interwired to one another before the equipment in the bay frame could be electrically tested for wiring defects. Accordingly, since this wiring and testing could best be accomplished at the manufacturing location, the connector plug-backplane assemblies generally were mounted in the bay frames and interwired in a factory, as above-described.

The subject invention relates to a unitary molded plastic backplane having high strength and resistance to flexing, for use in more recently proposed communications equipment. The electrical design of this equipment is such that two rows of the connector plugs can be mounted and interwired to produce a self-contained assembly which can be tested for wiring defects prior to mounting of the interwired plugs in a bay frame. Accordingly, the bay frames can be shipped directly to the central office from a frame manufacturing location, and the wired connector plug-backplane assemblies can be assembled and tested in a different manufacturing location. The wired connector plug-backplane assemblies then can be shipped to the central office for mounting in the bay frames in the central office. Thus, the necessity for shipping the bay frames to the wired connector plug-backplane assembling location and then to the central office after the wired connector plug-backplane assemblies have been mounted therein, and the necessity for providing storage and assembling space for the bay frames at the wired connector plug-backplane assembling location, can be eliminated.

SUMMARY OF THE INVENTION

In general, the subject invention relates to a unitary molded plastic connector plug support member having a plurality of spaced pedestals projecting from one side of a main body portion of the support member. The pedestals define channels therebetween for receiving wires and have openings extending therethrough for the reception of connector plugs in the openings. The pedestals also produce a ribbed construction having high strength and resistance to flexing.

More specifically, the support member includes at least two rows of the spaced projecting pedestals. Spaced support legs are integrally formed with and project from the one side of the main body portion beyond the pedestals for supporting the support member on a support surface with connector plugs which are mounted on the pedestals, spaced from engagement with the support surface. The support member includes alignment tabs along one edge thereof and alignment tab-receiving recesses along an opposite edge thereof, for aligning the support member with adjacent support members of similar construction. The support member is of stepped construction along the first and second edges thereof, and along the center thereof, to provide recesses for the reception of other associated support members, and to produce additional strength and resistance to flexing in the support member. Spaced alignment lugs are integrally formed with the main body in each of the recesses for aligning the support member with the support member which is receivable in the recess. The stepped portions also support associated input-output connectors, and the center stepped portion includes projecting cylindrical housings for receiving associated mounting devices to preclude tightening of the devices down onto adjacent wires.

BRIEF DESCRIPTION OF THE DRAWINGS

FIG. 3 is an elevational view of one side of a backplane in accordance with the invention;

DETAILED DESCRIPTION

Figures 1, 2:
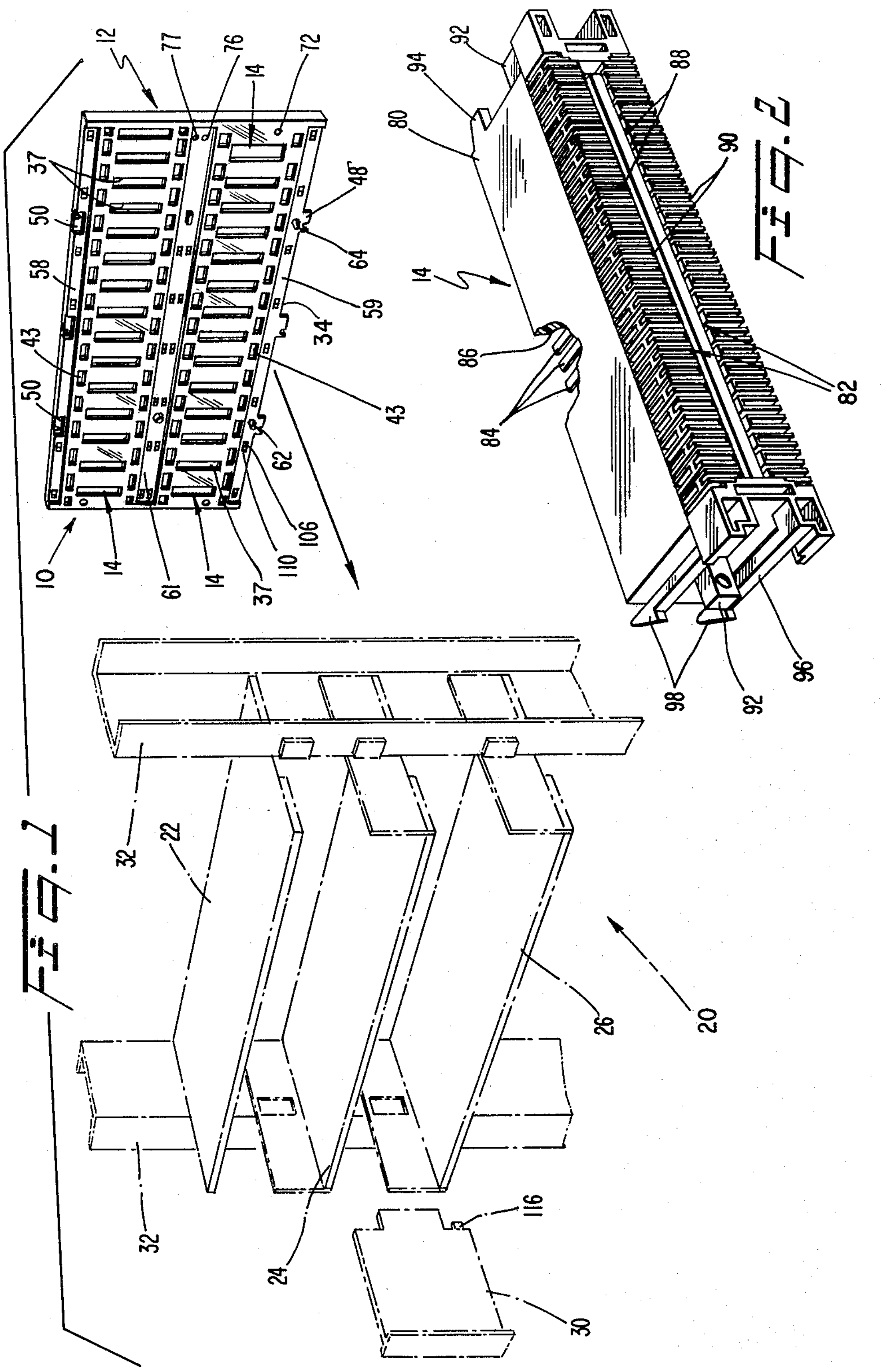
FIG. 1 is an isometric view of a backplane assembly in accordance with the invention, shown in conjunction with associated parts of a communications bay module.
FIG. 2 is an isometric view of a connector plug which may be utilized in the backplane assembly shown in FIG. 1.
Figure 2:
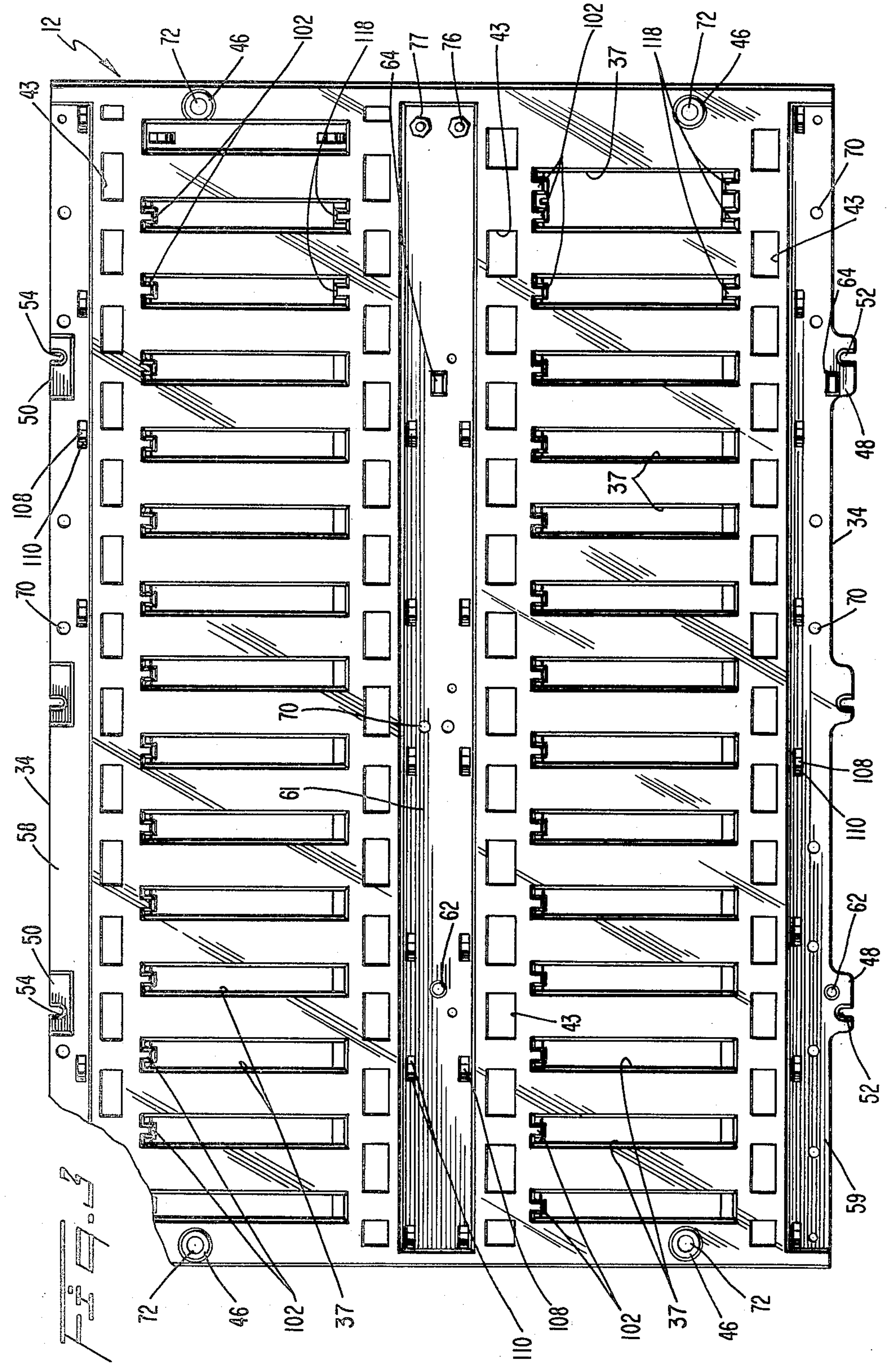

Referring to FIG. 1, the disclosed embodiment of the invention is directed to a backplane assembly 10, which includes a backplane member 12 for supporting edge connector plugs 14, input-output (I/O) connectors 16 (shown in FIG. 4) and associated interconnecting wires 18 (shown in FIG. 4), for use in a communications bay module 20. In addition to the backplane assembly 10, the module 20 includes a top cover 22, an upper support shelf 24 and a lower support shelf 26, of essentially identical construction. The support shelves 24 and 26 have spaced upwardly projecting guideways (not shown) for supporting and guiding lower edges of substrate circuit devices in the form of printed circuit boards 30 (one shown in FIG. 1) in the module, and the top cover and the upper support shelf have similar depending guideways (not shown) for receiving and guiding upper edges of the circuit boards. The top cover 22 and the support shelves 24 and 26 are attachable, by means of integral brackets and associated screws, to a pair of spaced vertically extending frame members 32 of a communications bay, and the backplane assembly 10 is attachable to the top cover plate, the support shelves and the frame members by suitable screws.

Figure 4:
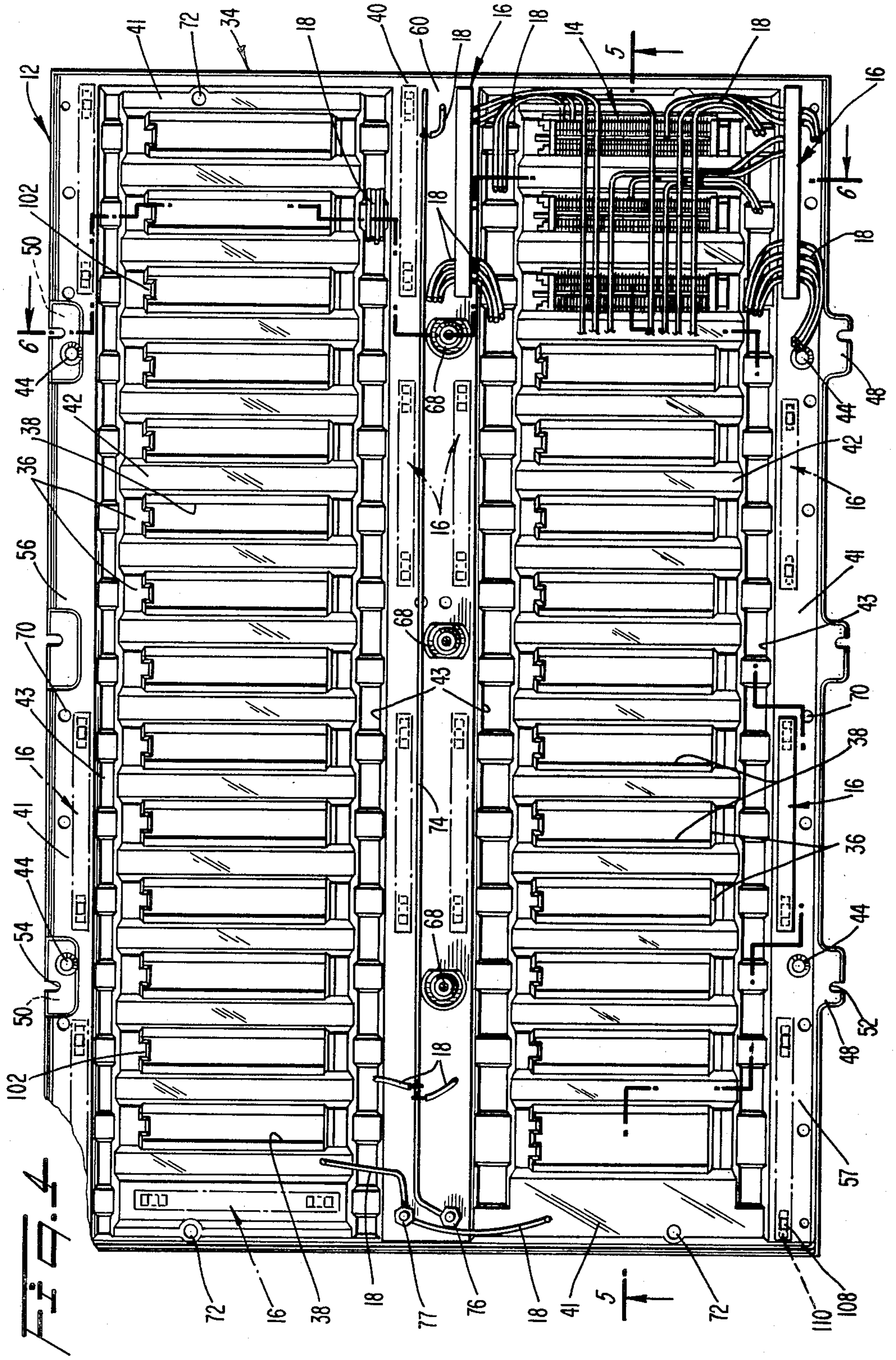
FIG. 4 is an elevational view of a partial backplane assembly from the opposite side of the backplane.
Figure 6:
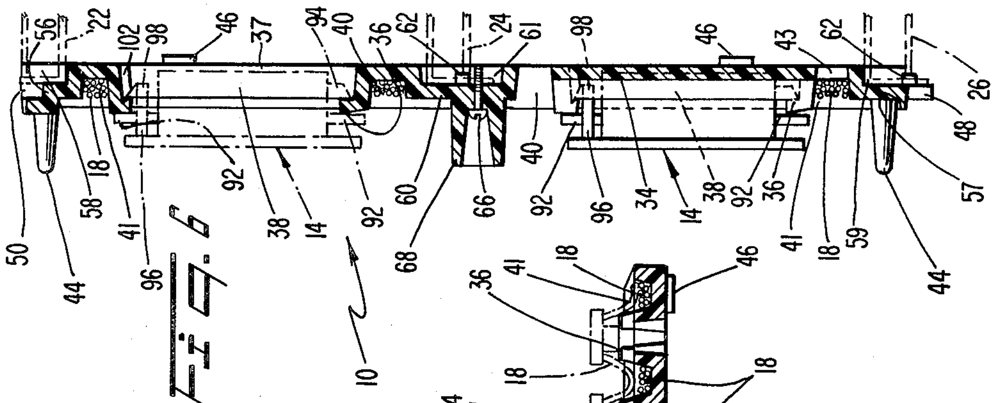
FIG. 6 is a cross-sectional view taken along the line 6—6 of FIG. 4.
Figure 5:
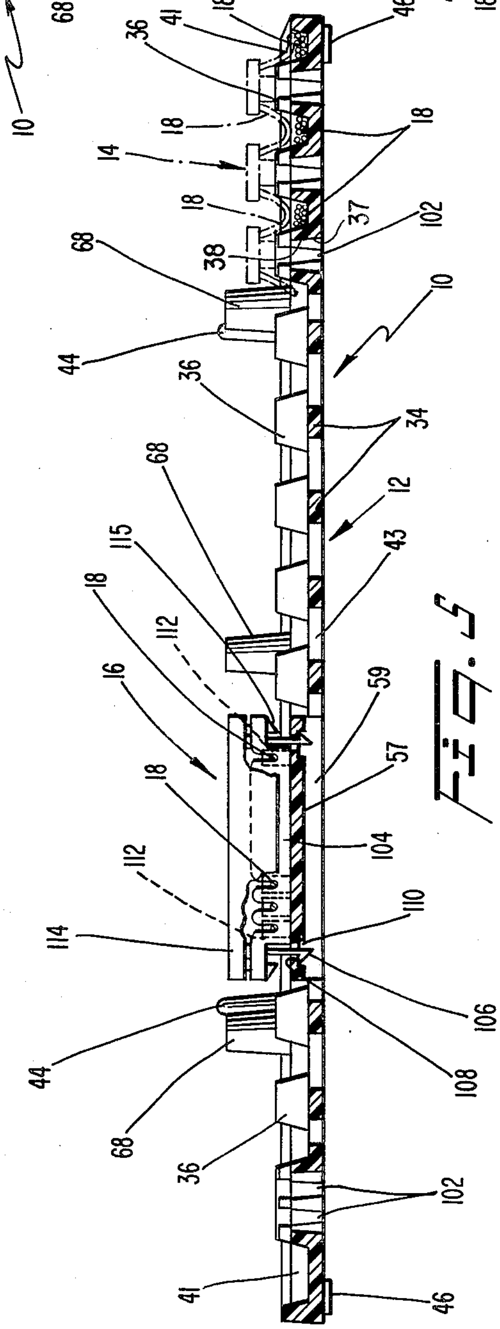
FIG. 5 is a cross-sectional view taken along the line 5—5 of FIG. 4.

The backplane 12, which is of unitary molded construction, may be formed of any suitable plastic, such as a chemically blown structural foam type sold by the General Electric Company under the trade name Noryl FN215 (natural). As is best shown in FIGS. 1 and 3, the backplane 12 includes an essentially planar main body portion 34 having two rows of rectangular openings 37 extending therethrough. The rectangular openings 37 are dimensioned for the insertion of the printed circuit boards 30 (one shown in FIG. 1) from a first side of the main body 34 through the openings and into the connector plugs 14, which are supported on an opposite second side of the main body portion as shown in FIGS. 5 and 6. In this connection, referring further to FIGS. 4, 5 and 6, the backplane main body 34 also has two rows of connector plug support pedestals 36 projecting from the second side thereof, with opposite side portions of each pedestal being depressed relative to opposite end portions of the pedestal as shown at the right-hand side of FIG. 5 and the left-hand side of FIG. 6. The pedestals 36 have rectangular openings 38 formed therethrough for receiving respective ones of the edge connector plugs 14 supported on the pedestals, with the openings 38 merging with respective ones of the openings 37 in the main body 34 as shown in FIGS. 5 and 6. The rows of the pedestals 36 are spaced apart to define an elongated central channel 40 therebetween, and are spaced from the edges of the backplane 12 to define portions of side channels 41 extending about the periphery of the backplane. The pedestals 36 in each row of the pedestals also are spaced apart to define branch channels 42 extending between the central channel 40 and the adjacent side channels 41, with the central channel, the side channels and the branch channels receiving the wires 18 extending between the connector plugs and the I/O connectors 16, as illustrated in FIGS. 4, 5 and 6. A bottom of the central channel 40, and bottoms of the side channels 41 extending along the upper and lower edges of the backplane 12 as viewed in FIGS. 1, 3, 5 and 6, each include a row of spaced openings 43 therein to reduce the weight of the backplane, and to facilitate air circulation between the printed circuit boards 30.

In addition to providing raised supports for the connector plugs 14 and defining the channels 40, 41 and 42 for the wires 18 extending between the connector plugs and the I/O connectors 16, as is best shown in FIG. 5, the pedestals 36 provide the backplane 12 with a generally ribbed construction of high strength which is resistant to flexing and warping. This is advantageous from the standpoint of enabling the backplane assembly 10, consisting of the backplane 12, the connector plugs 14, the I/O connectors 16 and the wires 18, to be assembled in a factory and subsequently be properly mounted in a communications bay in the field. Further, the resistance to flexing is particularly important when the printed circuit boards 30 (FIG. 1) are inserted into the connector plugs 14 in the field.

As is shown in FIGS. 4, 5 and 6, the molded backplane 12 further includes a plurality of elongated spaced legs 44 integrally formed with the main body 34 and projecting from the second side of the main body perpendicularly to the plane of the main body beyond the pedestals. The legs 44 can be used, for example, to support the backplane assembly 10 on a support surface, with the connector plugs 14 and the I/O connectors 16 spaced from contact with the surface, to preclude damage to the plugs, the connectors and/or disruption of the wires 18. In addition, the first side of the backplane 12 includes integrally formed support pads 46 (FIGS. 3, 5 and 6).

The backplane 12 further includes alignment tabs 48 projecting from a lower edge thereof, as viewed in FIGS. 1, 3 and 4, and alignment tab-receiving recesses 50 formed in the opposite upper edge thereof, as viewed in these figures. Thus, when the backplane assembly 10 is mounted in the transmission bay module 20 (FIG. 1), the alignment tabs 48 of the backplane 12 are receivable in corresponding recesses 50 in a backplane (not shown) therebeneath, and the recesses 50 of the backplane receive alignment tabs of a backplane (not shown) thereabove, to align the backplanes vertically in the transmission bay. The alignment tabs 48 and the walls of the recesses 50 of the backplane 12 also are formed with slots 52 and 54, respectively, for receiving screws (not shown) for securing the backplane to the top cover plate 22 and the lower support shelf 26 of the communications bay module 20.

As is best shown in FIG. 6, the main body 34 of the backplane 12 includes stepped portions 56 and 57 adjacent upper and lower edges thereof to define elongated upper and lower recesses 58 and 59 on the first side of the main body which receive edge portions of the top cover plate 22 (FIG. 1) and the lower support shelf 26 (FIG. 1), respectively, when the backplane assembly 10 is mounted thereon. In this connection, as is shown at the opposite sides of FIG. 6, each of the stepped portions 56 and 57 includes a first wall portion extending perpendicularly from the main body 34 and a second wall portion offset from the main body and projecting perpendicularly from an outer end of the first wall portion parallel to the main body, to define the recesses 58 and 59, with the pedestals 36 and the first wall portions being spaced apart and defining the above-mentioned elongated side channels 41 therebetween. The second wall portions of the stepped edge portions 56 and 57 also have the above-mentioned elongated support legs 44 integrally molded therewith, as shown in FIGS. 4, 5 and 6. A central portion 60 of the main body 34 of the backplane 12 also is of stepped construction and, as is shown in the center of FIG. 6, has spaced first wall portions extending perpendicularly from the main body and a second wall portion offset from the main body and extending between outer ends of the first wall portions parallel to the main body, to define an elongated central recess 61 on the first side of the main body for receiving edge portions of the upper support shelf 24. This stepped construction further provides the backplane 12 with additional strength and resistance to flexing, with its attendant advantages, as noted hereinabove.

Alignment of the backplane 12 with the upper and lower support shelves 24 and 26 is facilitated by circular alignment lugs 62 (FIGS. 3 and 6) which project from the backplane in the lower and central recesses 59 and 61 adjacent one end of the backplane for reception in corresponding circular apertures in the support shelves. Similarly, elongated rectangular alignment lugs 64 (FIG. 3) project from the backplane 12 in the lower and central recesses 59 and 61 adjacent the opposite end of the backplane for reception in elongated slots in the support shelves 24 and 26.

In mounting of the backplane assembly 10 in the transmission bay module 20 (FIG. 1), the backplane 12 is secured to the upper support shelf 24 by screws 66 (one shown schematically in FIG. 6) extendable through the backplane into a depending tab portion of the shelf. To preclude tightening of heads of the screws 66 down onto one of the wires 18 of the completed backplane assembly 10 during this mounting operation, and possibly damaging and short-circuiting the wire, the heads of the screws are received in inner cylindrical passageways in protective cylindrical housings 68 of the backplane 12 projecting from the central stepped portion 60 of the backplane main body 34 and integrally formed therewith, as illustrated in FIG. 6.

In the wiring of the connector plugs 14 and I/O connectors 16, it is desirable to utilize wiring pins (not shown) about which the wires 18 may be routed. Accordingly, referring to FIGS. 3 and 4, the main body 34 of the backplane 12 is formed with a plurality of apertures 70 through which these wiring pins may be received when the backplane is mounted in a fixture (not shown) for the wiring operation. The backplane 12 also includes screw-receiving apertures 72 adjacent its opposite ends for securing the backplane to the frame members 32 (FIG. 1) of the communications bay. Adjacent the right-hand side of the backplane 12 as viewed in FIG. 4, a right-angle end portion (not shown) of a circular grounding rod 74 is captivated in another aperture in the backplane, with the other end of the grounding rod being secured to the backplane by a screw-threaded stud-nut assembly 76 in the backplane adjacent its left-hand side in this figure. An input power lug 77 also is mounted in a respective aperture in the backplane 12 adjacent the left-hand side thereof as viewed in FIG. 4.

Referring to FIG. 2, each of the connector plugs 14, which may be of any suitable construction, is shown as being of a snap-in type which includes a molded plastic insulating body 80 having two spaced rows of electrical terminals 82 mounted therein. At one end each of the terminals 82 includes a contact blade portion 84 for making contact with a contact finger (not shown) on one of the printed circuit boards 30 (FIG. 1) when the board is inserted into an elongated slot 86 formed in the body 80 of the connector plug 14. At its other end each of the terminals 82 includes an insulation-displacement contact portion 88 for making electrical contact with one of the wires 18 when the wire is inserted into fingers of the contact portion and an adjacent guide slot 90 formed in the body 80 of the connector plug 14.

At its opposite ends the connector plug 14 includes projecting stop lugs 92 which limit the extent to which the connector plug insulating body 80 can be inserted into the opening 38 in one of the pedestals 36, as is illustrated in FIG. 6. At one end the connector plug 14 also includes rigid projecting latch portions 94, and at its opposite end the connector plug includes a pair of depending resilient fingers 96 having latch portions 98 at their free ends. The rigid latch portions 94, and the latch portions 98 on the resilient fingers 96, are engageable with retaining portions of the pedestal 36 to releasably lock the connector plug 14 on the pedestal when the plug is inserted in the opening 38 in the pedestal, as shown in FIG. 6. The resilient fingers 96 also permit limited longitudinal movement of the connector plug 14 within the opening 38 in the pedestal 36, to compensate for any slight misalignment between the connector plug and one of the printed circuit boards 30 when the printed circuit board is inserted into the connector plug. Centering of the connector plug 14 in the opening 38 in the pedestal 36 in a transverse direction is provided by a rib 102 (FIGS. 3 and 4) in the opening which is receivable between the latches 98 on the resilient fingers 96 of the connector plug in relatively close-fitting relationship.

Referring to FIG. 4, the majority of the I/O connectors 16 are mounted on the main body 34 of the backplane 12 on the stepped portions 56, 57 and 60 of the main body. However, the I/O connectors 16 also may be mounted on raised portions of the main body 34 in line with the rows of the edge connector plugs 14, as illustrated by one of the I/O connectors 16 in the upper left-hand corner of FIG. 4.

Referring to the center of FIG. 5, as in the case of the printed circuit board edge connector plugs 14, the I/O connectors 16 may be of any suitable construction and are shown as being of a snap-in type, having an elongated plastic body 104 with integrally formed resilient latch fingers 106 projecting therefrom adjacent opposite ends thereof. The resilient latch fingers 106 are receivable through respective apertures 108 in the backplane 12 and have latch portions engageable in recesses 110 on the opposite side of the backplane, to secure the connector to the backplane. Each of the I/O connectors 16 also includes two rows of insulation-displacement terminals 112 mounted in the body 104 thereof adjacent wire-receiving guide slots of the body. In addition, each I/O connector 16 includes a cap member 114 for each row of the terminals 112, with each cap member having wire-receiving slots (not shown) in which associated ones of the wires 18 can be fanned and then pressed into their respective terminals 112 in the connector body 104 as the cap member is mounted on the body. Each of the cap members 114 also includes resilient latching fingers 115 for retaining the cap member on the connector body 104.

Since the manner in which the wires 18 are routed between the edge connector plugs 14 and the I/O connectors 16 forms no part of this invention, only a representative sampling of the wires are shown in FIG. 4. In this connection, in wiring of the I/O connectors 16 to the connector plugs 14 with the wires 18, each of the wires is inserted in one of the terminals 112 in a respective one of the I/0 connectors, and then routed to an associated edge connector plug in one of the rows of connector plugs and inserted in respective terminals 82 (FIG. 2) in this plug. The wire 18 then is successively inserted in terminals 82 in other associated edge connector plugs 14 in the same row of connector plugs to form a wire "mult" in a known manner. Additional ones of the wires 18 are routed from the grounding rod 74 and the power input lug 77 to the connector plugs 14 in a similar manner. Subsequently, when the completely wired backplane assembly 10 is mounted in the transmission bay module 20 (FIG. 1), the assembly is electrically connected to associated central office equipment by an installer inserting additional connecting wires (not shown) in the terminals 112 (FIG. 5) of the I/O connectors 16 utilizing the fanning-and-insertion cap members 114, and by connecting ground and power conductors to the grounding bar 74 (FIG. 4) and the power input lug 77 (FIG. 4).

In connecting the wires 18 to the connector plugs 14, the wires may be routed in the central channel 40 of the backplane 12, around the periphery of the backplane in the channels 41, and/or in the branch channels 42 of the backplane, in any preselected manner, as desired. In this regard, referring to the right-hand side of FIG. 5, since the edge connector plugs 14 are elevated substantially relative to the bottoms of the branch channels 42 as a result of the connector plugs being mounted on the channel-defining pedestals 36, the portions of the wires 18 disposed in the branch channels and the portions of the wires interconnecting the connector plugs do not interfere with one another, as is apparent in this figure.

In the backplane assembly 10 disclosed herein, the connector plugs 14 on the pedestals 36, with the exception of the two right-hand connector plugs in each row, as viewed in FIG. 3, are used in conjunction with signaling circuit boards 30 in the communications bay module 20. The right-hand connector plugs 14 in each row in FIG. 3 are used in conjunction with power supply circuit boards 30 and the next adjacent connector plugs in each row are used in conjunction with common control circuit boards 30. In this connection, the plug-centering ribs 102 in the pedestal openings 38 in which the signaling circuit connector plugs 14 are received may cooperate with a projection 116 (FIG. 1) on the associated printed circuit board 30 to prevent insertion of the printed circuit board in one of the connector plugs in an inverted position. Similarly, the pedestal openings 38 in the backplane 12 for the power supply and common control circuit connector plugs 14 may be provided with an additional rib 118 at the opposite end of the opening, as shown in FIG. 3, to prevent inadvertent insertion of one of the signaling circuit boards 30 into either of these connector plugs.

Each of the connector plug-receiving openings 38 in the backplane 12 is of identical size except the opening for one of the power supply connector plugs 14 at the lower right-hand corner of the backplane, as viewed in FIG. 3 (lower left corner of the backplane as viewed in FIG. 4). The latter opening 38 is of double size and illustrates a condition in which it may be necessary to mount one of the connector plugs 14 in either of two positions in the opening, depending on the configuration of the associated power supply circuit board 30 to be received in the connector plug, as for example, a single printed circuit board in one instance, or a mother-daughter printed circuit board combination in another instance.

In summary, a new and improved backplane assembly 10 for use in a communications bay module 20 has been disclosed. The backplane assembly 10 includes a unitary molded plastic backplane 12 having high strength and resistance to flexing, for supporting the edge connector plugs 14, the I/O connectors 16 and the interconnecting wires 18 of the assembly. The high strength and resistance to flexing of the backplane 12 is produced as a result of the essentially ribbed construction of the backplane defined by the connector plug-supporting pedestals 36, and as a result of the stepped construction of the I/O connector-supporting portions 56, 57 and 60. The pedestals 36 also define the central channel 40, the side channels 41 and the branch channels 42, for receiving the wires 18. In addition, the projecting legs 44 of the backplane 12 permit inverting of the completed backplane assembly 10 and supporting of the backplane assembly on a support surface without damage to the connector plugs 14, the I/O connectors 16 and/or disruption of the wires 18. Damage to adjacent wires 18 during mounting of the backplane 12 to the upper support shelf 24 of the communications bay module 20 by the screws 66 (FIG. 6) is precluded by the screws being received within the projecting cylindrical housings 68 of the backplane. Further, proper alignment of the backplane 12 in the transmission bay module 20 is facilitated by the alignment tabs 48, the alignment tab-receiving recesses 50, and the alignment lugs 62 and 64.

What is claimed is:

1. A unitary molded plastic backplane member for equipment of a type in which substrate circuit devices on one side of the backplane member are inserted into connector plugs mounted on an opposite side of the backplane member, which comprises:

an essentially planar main body having opposite first and second sides and having at least one row of openings extending through the main body, the openings being dimensioned for the insertion of substrate circuit devices from the first side of the main body through the openings; and at least one row of spaced pedestals integrally molded with the main body and projecting from the second side of the main body to define channels between the pedestals, the pedestals having openings extending therethrough for the reception of the connector plugs in the openings and merging with respective ones of the openings in the main body.

2. A unitary molded plastic backplane member as recited in claim 1, in which:

the main body of the backplane member has at least two rows of the openings extending therethrough and includes at least two rows of the spaced projecting pedestals on the second side thereof, the rows of pedestals defining an elongated main channel therebetween and the pedestals in each row defining branch channels extending from the main channel.

3. A unitary molded plastic backplane member as recited in claim 1, which further comprises:

elongated stepped portions integrally molded with the main body and extending adjacent opposite edges of the main body, each of the elongated stepped portions including a first wall portion extending perpendicularly from the main body and a second wall portion offset from the main body and projecting perpendicularly from an outer end of the first wall portion parallel to the main body, the first and second wall portions defining elongated recesses on the first side of the main body for receiving other associated support members in the recesses, and the pedestals and the first wall portions of the elongated stepped portions being spaced apart and defining elongated side channels therebetween.

4. A unitary molded plastic backplane member as recited in claim 2, which further comprises:

elongated stepped portions integrally molded with the main body and extending adjacent opposite edges of the main body, each of the elongated stepped portions including a first wall portion extending perpendicularly from the main body and a second wall portion offset from the main body and projecting perpendicularly from an outer end of the first wall portion parallel to the main body, the first and second wall portions defining elongated recesses on the first side of the main body for receiving other associated support members in the recesses, and the pedestals and the first wall portions of the elongated stepped edge portions being spaced apart and defining elongated side channels therebetween; and an elongated central stepped portion integrally molded with the main body, the central stepped portion extending parallel to the elongated stepped edge portions of the main body and extending centrally of the main body in the main channel defined by the rows of projecting pedestals, the central stepped portion being offset with respect to the first side of the main body and defining an elongated central recess on the first side of the main body for receiving another associated support member in the central recess.

5. A unitary molded plastic backplane member as recited in claim 3, which further comprises:

elongated spaced support legs integrally molded with and projecting from the second wall portions of the elongated stepped edge portions of the main body on the second side of the main body and extending perpendicularly to the plane of the main body beyond the pedestals on the second side of the main body.

6. A unitary molded plastic, backplane member as recited in claim 4, wherein the elongated central stepped portion of the main body of the backplane member is mountable on the associated support by mounting devices having retaining heads thereon, which further comprises:

a plurality of spaced cylindrical housings integrally molded with and projecting from the elongated central stepped portion of the main body on the second side of the main body and having inner cylindrical passageways for the reception of the retaining heads of the retaining devices within the housings.

7. A unitary molded plastic backplane member as recited in claim 3, which further comprises:

alignment tabs integrally molded with the second wall portion of one of the elongated stepped edge portions of the main body and projecting therefrom for reception in alignment tab-receiving openings in an adjacent backplane member; and alignment tab-receiving recesses molded in the second wall portion of the other of the elongated stepped edge portions of the main body for receiving alignment tabs on an adjacent backplane member.

8. A unitary molded plastic backplane member as recited in claim 4, which further comprises:

spaced alignment lugs integrally molded with at least one of the elongated stepped portions of the main body and projecting from the elongated stepped portion on the first side of the main body for aligning the backplane member with an adjacent support member.

9. A unitary molded plastic backplane for a communications bay module in which substrate circuit devices on one side of the backplane are inserted into connector plugs on an opposite side of the backplane, which comprises:

an essentially planar main body having opposite first and second sides and having at least two rows of openings extending through the main body, the openings being dimensioned for the insertion of substrate circuit devices from the first side of the main body through the openings;

at least two rows of spaced pedestals integrally molded with the main body and projecting from the second side of the main body, the spaced pedestals defining an elongated main channel and branch channels therebetween, the pedestals having openings extending therethrough for the reception of connector plugs in the openings, and the openings in the pedestals merging with respective ones of the openings in the main body;

elongated stepped portions integrally molded with the main body and extending adjacent opposite edges of the main body, each of the stepped edge portions including a first wall portion extending perpendicularly from the main body and a second wall portion offset from the main body and projecting perpendicularly from an outer end of the first wall portion parallel to the main body, the first and second wall portions defining elongated recesses for the reception of other associated support members of the communications bay module therein, and the projecting pedestals and the first wall portions of the elongated stepped portions being spaced apart and defining elongated side channels therebetween; and an elongated central stepped portion integrally molded with the main body, the central stepped portion extending parallel to the elongated stepped edge portions of the main body and extending centrally of the main body in the main channel defined by the rows of projecting pedestals, the central stepped portion being offset with respect to the first side of the main body and defining an elongated central recess on the first side of the main body for receiving another associated support member of the communications bay module in the central recess.

10. A unitary molded plastic backplane for a communications bay module, as recited in claim 9, which further comprises:

elongated spaced support legs integrally molded with and projecting from the second wall portions of the elongated stepped edge portions of the main body on the second side of the main body and extending perpendicularly to the plane of the main body beyond the pedestals on the second side of the main body.

11. A wired assembly for equipment of a type in which substrate circuit devices on one side of the wired assembly are inserted into respective connector plugs mounted on an opposite side of the wired assembly, which comprises:

a unitary molded plastic support member having an essentially planar main body with opposite first and second sides and at least one row of openings extending through the main body, the openings being dimensioned for the insertion of substrate circuit devices from the first side of the main body through the openings;

at least one row of spaced pedestals integrally molded with the main body and projecting from the second side of the main body to define channels between the pedestals, the pedestals having openings extending therethrough and merging with respective ones of the openings in the main body;

a plurality of connector plugs mounted on respective ones of the pedestals in the openings in the pedestals for the recepton of the substrate circuit devices in the connector plugs from the first side of the main body; and a plurality of wires extending between the connector plugs in the channels between the pedestals.

12. A wired assembly as recited in claim 11, in which:

the main body of the support member has at least two rows of the openings extending therethrough and includes at least two rows of the spaced projecting pedestals on the second side thereof, with connector plugs mounted on the pedestals, the rows of pedestals defining an elongated main channel therebetween and the pedestals in each row defining branch channels extending from the main channel.

13. A wired assembly as recited in claim 11, which further comprises:

elongated stepped portions integrally molded with the main body of the support member and extending adjacent opposite edges of the main body, each of the elongated stepped portions including a first wall portion extending perpendicularly from the main body and a second wall portion offset from the main body and extending from an outer end of the first wall portion parallel to the main body, the first and second wall portions defining elongated recesses on the first side of the main body for the reception of other associated support members therein, and the pedestals and the first wall portions of the elongated stepped portions being spaced apart and defining wire-receiving side channels therebetween.

14. A wired assembly as recited in claim 12, which further comprises:

elongated stepped portions integrally molded with the main body of the support member and extending adjacent opposite edges of the main body, each of the elongated stepped portions including a first wall portion extending perpendicularly from the main body and a second wall portion offset from the main body and extending from an outer end of the first wall portion parallel to the main body, the first and second wall portions defining elongated recesses on the first side of the main body for the reception of other associated support members therein, and the pedestals and the first wall portions of the elongated stepped portions being spaced apart and defining wire-receiving side channels therebetween and in communication with the branch channels between the pedestals; and an elongated central stepped portion integrally molded with the main body and extending parallel to the elongated stepped edge portions of the main body and centrally of the main body in the main channel defined by the rows of projecting pedestals, the central stepped portion including spaced first wall portions extending perpendicularly from the main body and a second wall portion offset from the main body and extending between outer ends of the first wall portions parallel to the main body, the first wall portions and the second wall portion defining an elongated central recess on the first side of the main body for receiving another associated support member in the recess.

15. A unitary molded plastic backplane member as recited in claim 1, wherein each connector plug to be supported includes electrical terminals mounted in an insulating body, and in which:

the openings in the integrally molded pedestals are formed to receive the insulating bodies of the connector plugs.

16. A unitary molded plastic backplane member as recited in claim 1, in which:

the spaced pedestals include opposite end portions and opposite side portions projecting from the second side of the main body, with the opposite side portions being depressed with respect to the opposite end portions.

* * * * *

UNITED STATES PATENT AND TRADEMARK OFFICE

CERTIFICATE OF CORRECTION

PATENT NO. : 4,353,614

DATED : October 12, 1982

INVENTOR(S) : John O. Etchison, Jr., Robert H. W. Jones, Jr.

It is certified that error appears in the above-identified patent and that said Letters Patent are hereby corrected as shown below:

On the frontispiece of the patent, in the left column for item "[73]", it should read:

--[73] Assignees: Western Electric Company, Inc.; Bell Telephone Laboratories, Incorporated, Murray Hill, Berkeley Hgts, N.J. --.

Signed and Sealed this

*Seventeenth* Day of *May 1983*

[SEAL]

*Attest:*

DONALD J. QUIGG

*Attesting Officer* *Acting Commissioner of Patents and Trademarks*